US012684009B2

(12) United States Patent
Ailabouni et al.

(10) Patent No.: US 12,684,009 B2
(45) Date of Patent: Jul. 14, 2026

(54) OUT OF BAND THREAT PREVENTION

(71) Applicant: Mellanox Technologies, Ltd., Yokneam (IL)

(72) Inventors: Rami Ailabouni, Eilabun (IL); Meni Orenbach, Giv'atayim (IL); Ahmad Atamli, Oxford (GB)

(73) Assignee: Mellanox Technologies, Ltd., Yokneam (IL)

( * ) Notice: Subject to any disclaimer, the term of this patent is extended or adjusted under 35 U.S.C. 154(b) by 171 days.

(21) Appl. No.: 18/453,199

(22) Filed: Aug. 21, 2023

(65) Prior Publication Data

US 2024/0283813 A1 Aug. 22, 2024

(30) Foreign Application Priority Data

Feb. 16, 2023 (IL) .......................................... 300743

(51) Int. Cl.
| | |
|---|---|
| *H04L 9/40* | (2022.01) |
| *G06F 9/455* | (2018.01) |
| *G06F 15/16* | (2006.01) |
| *G06F 15/173* | (2006.01) |
| *G06F 21/16* | (2013.01) |
| *H04L 9/32* | (2006.01) |
| *H04L 15/16* | (2006.01) |
| *H04L 41/40* | (2022.01) |
| *H04L 45/302* | (2022.01) |

(52) U.S. Cl.
CPC ...... *H04L 63/1441* (2013.01); *G06F 9/45558* (2013.01); *H04L 63/1416* (2013.01); *G06F 2009/45587* (2013.01); *G06F 2009/45595* (2013.01)

(58) Field of Classification Search
CPC ............. H04L 63/1441; H04L 63/1416; G06F 9/45558; G06F 2009/45587; G06F 2009/45595
USPC .......................................................... 726/23
See application file for complete search history.

(56) References Cited

U.S. PATENT DOCUMENTS

| | | | | |
|---|---|---|---|---|
| 12,243,306 B1 * | 3/2025 | Rothschild | ............. | G06V 20/44 |
| 2013/0132690 A1 * | 5/2013 | Epstein | ................. | G06F 12/145 |
| | | | | 711/159 |
| 2014/0143869 A1 * | 5/2014 | Pereira | ................... | G06F 21/564 |
| | | | | 726/23 |

(Continued)

FOREIGN PATENT DOCUMENTS

CN 103019752 A * 4/2013

OTHER PUBLICATIONS

Host-based Intrusion Detection and Prevention System (HIDPS). International Journal of Computer Applications (0975-8887) vol. 69—No. 26, pp. 27-33. May 2013.*

*Primary Examiner* — Berhanu Shitayewoldetadik
(74) *Attorney, Agent, or Firm* — Lowenstein Sandler LLP

(57) ABSTRACT

A system includes a data processing unit (DPU). The DPU is to receive a notification associated with a virtualized computing environment on a host system coupled to the DPU. The DPU is associated with a security characteristic. A threat type associated with the threat is identified. Based on at least one of the threat type associated with the threat or the security characteristic of the virtualized computing environment, a threat prevention operation to address the threat is determined. The threat prevention operation is caused to be performed on the host system.

20 Claims, 4 Drawing Sheets

300

(56) References Cited

U.S. PATENT DOCUMENTS

| | | | | |
|---|---|---|---|---|
| 2017/0192851 | A1* | 7/2017 | Per | G06F 16/11 |
| 2019/0278923 | A1* | 9/2019 | Zhang | H04L 65/403 |
| 2020/0089881 | A1* | 3/2020 | Graun | G06F 21/565 |
| 2021/0149587 | A1* | 5/2021 | Lukoshkov | G06F 3/0655 |
| 2021/0216666 | A1* | 7/2021 | Miller | G06F 12/1408 |
| 2025/0088518 | A1* | 3/2025 | Kim | H04L 51/42 |

* cited by examiner

300

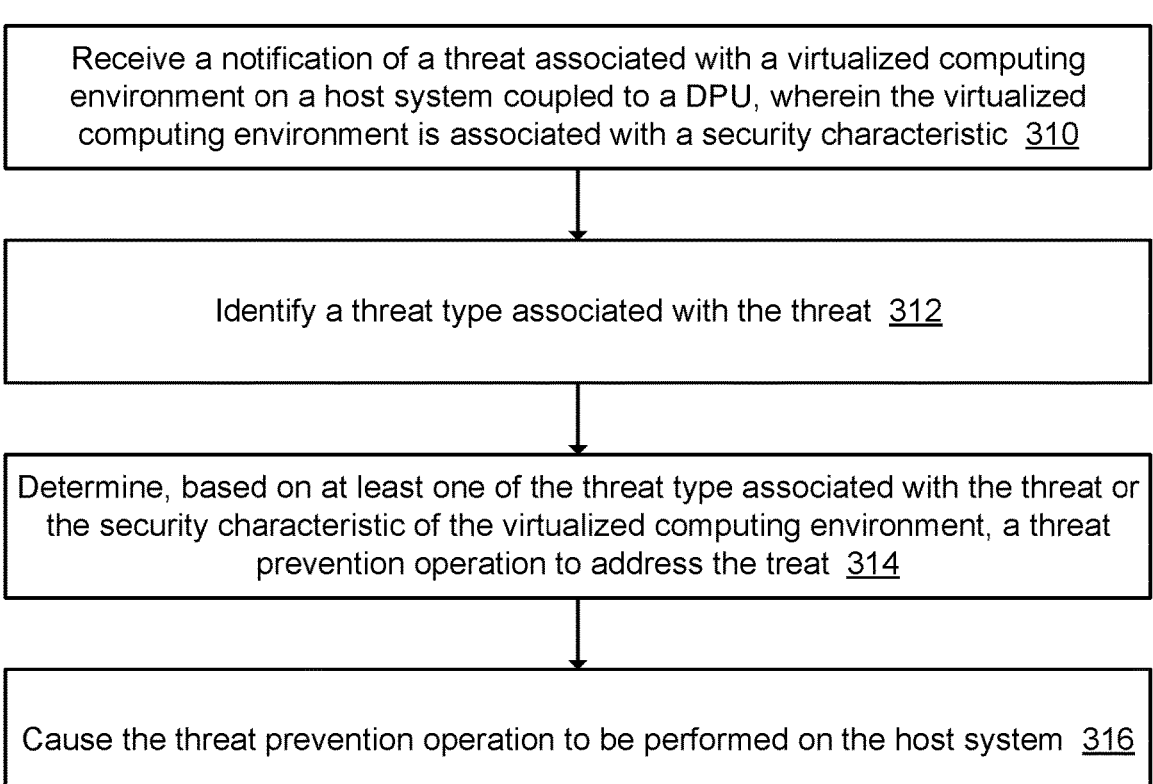

Receive a notification of a threat associated with a virtualized computing environment on a host system coupled to a DPU, wherein the virtualized computing environment is associated with a security characteristic 310

Identify a threat type associated with the threat 312

Determine, based on at least one of the threat type associated with the threat or the security characteristic of the virtualized computing environment, a threat prevention operation to address the treat 314

Cause the threat prevention operation to be performed on the host system 316

FIG. 3

OUT OF BAND THREAT PREVENTION

RELATED APPLICATIONS

The present application claims priority under 35 U.S.C. § 119(a) to Israel Patent Application No. 300,743, filed on Feb. 16, 2023 and entitled "Out of Band Threat Prevention," the contents of which are incorporated by reference herein in their entirety for all purposes.

TECHNICAL FIELD

At least one embodiment pertains to processing resources used to perform and facilitate out of band threat prevention for virtualized computing environments. For example, at least one embodiment pertains to processors or computing systems used to provide and enable a peripheral (e.g., PCIe) device (e.g., a data processing unit (DPU)) to implement a threat prevention operation on a host system to address a detected threat on a virtualized computing environment operating on the host system, according to various novel techniques described herein.

BACKGROUND

In a virtualized computing environment, conventional threat detection and prevention can occur on the host, for example, by the virtualized computing environment or by the virtualized computing environment manager (e.g., the hypervisor). A threat detection system attempts to identify malicious activity, while a threat prevention system attempts to prevent the identified malicious activity.

BRIEF DESCRIPTION OF DRAWINGS

Various embodiments in accordance with the present disclosure will be described with reference to the drawings, in which:

FIG. 3 is a flow diagram of an example method for implementing out of band threat prevention, in accordance with one or more aspects of the present disclosure.

DETAILED DESCRIPTION

Figure 1:
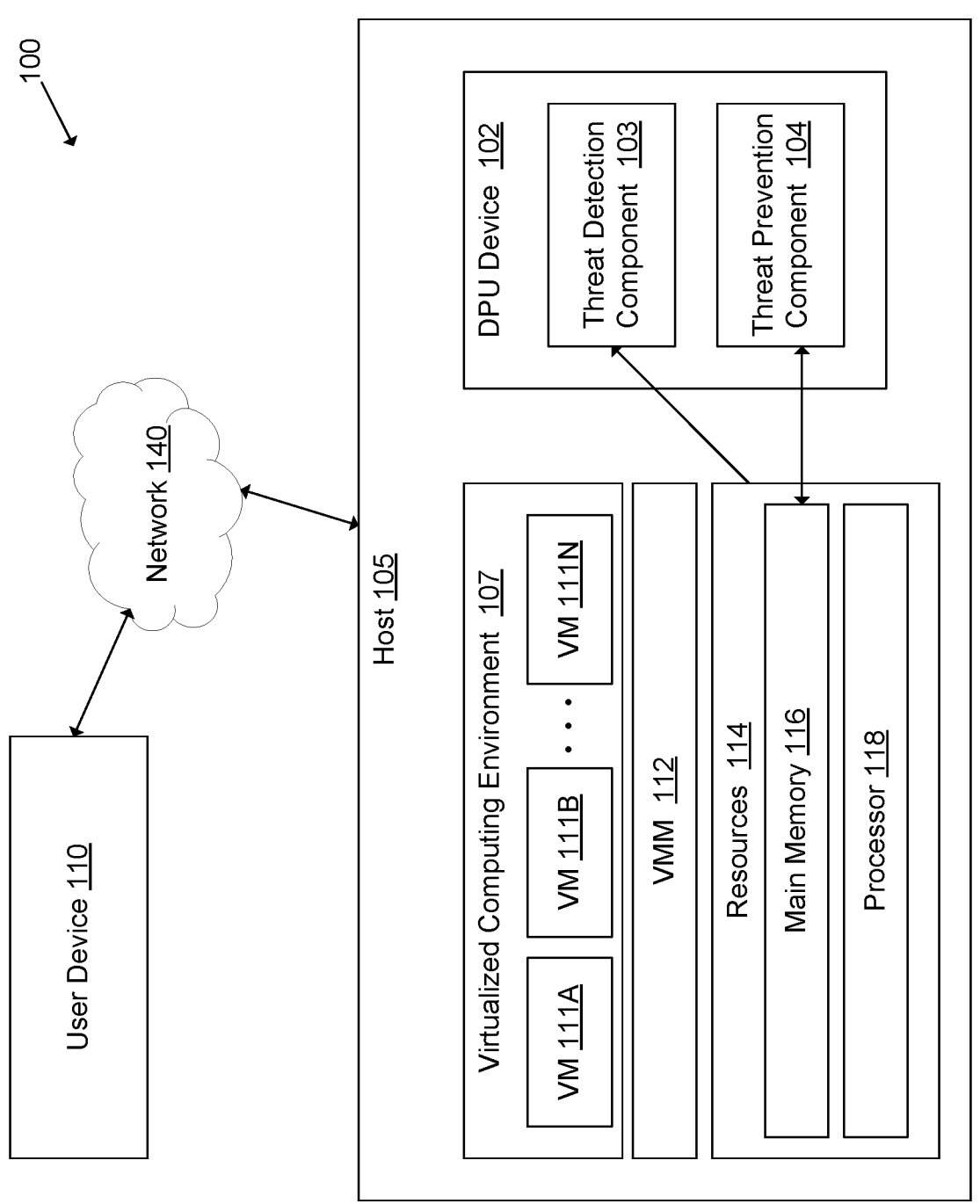
FIG. 1 depicts a block diagram of an example computer system environment architecture operating in accordance with one or more aspects of the present disclosure.

Modern computing systems (e.g., computing systems for data centers, etc.) can provide access to resources in a virtualized computing environment (e.g., a virtual machine, a container, etc.). For instance, a virtualization manager of a computing system can abstract and/or emulate one or more virtualized computing systems as standalone machines (e.g., from a user perspective). The computing system may be referred to herein as a "host system" or simply a "host," while the virtualized computing systems may be referred to herein as a "guest system" or simply a "guest." A virtualization manager can be part of a host operating system, a hypervisor, a virtual machine monitor, or the like, and a guest may be a virtual machine, a container, or the like. The virtualization manager can expose physical resources of the host as virtual resources to a respective guest. For example, a virtualization manager can partition one or more regions of physical memory of the host (e.g., random access memory (RAM), storage memory, etc.) and can expose a collection of such partitioned regions of memory to a guest as virtual memory (referred to herein as "guest memory"). Memory in a contiguous physical memory address space or a non-contiguous physical memory address space can be exposed to a guest as guest memory in a contiguous guest memory address space.

Computing systems, such as data centers that store user data, can be susceptible to cyber threats caused by malicious activity. Malicious activity can be caused by malware (also referred to as malicious software or malicious code). Malware is any software intentionally designed to cause disruption to a computer, server, client, or computer network, leak private information, gain unauthorized access to information or resources, deprive users of access to information, or knowingly interfere with the user's computer security and privacy. Common malware can include computer viruses (e.g., a Trojan horse virus) or other infectious malware, worms, spyware, adware, rogue software, wiper, scareware, ransomware, backdoors, fishing, or the like.

Security systems can include a wide range of technologies and solutions to protect such computing systems from external and internal threats or attacks. Data centers, for example, hold sensitive or proprietary information, such as customer data or intellectual property, and thus their servers need to be secured and protected all the time from known and unknown network attacks, malware, malicious activity, and the like. A data center is a facility that includes different devices, such as switches, routers, load balancers, firewalls, servers, networked computers, storage, network interface cards (NICs), DPUs, GPUs, and other resources as part of the information technology (IT) infrastructure. Data centers provide services, such as storage, backup and recovery, data management, networking, security, orchestration, or the like. Security components and advanced technologies can be used to protect devices and services.

One type of malicious activity is caused by ransomware. Ransomware is a malware designed to deny a user or organization access to files on their computer. Ransomware can be encryption-based or screen-lock-based ransomware. For example, by encrypting files and demanding a ransom payment for the decryption key, ransomware places organizations in a position where paying the ransom is the easiest and cheapest way to regain access to their files. Existing security solutions for ransomware are installed on a host machine or a virtual machine (e.g., agent-based antivirus solutions). These existing solutions are insufficient since malware can evade them. Moreover, these tools are largely incapable of detecting new unknown malware because most of them are based on static analysis, and it is easier to create different malware with different static features.

A security system can include operations to prevent detected threats directed to virtualized computing environments (e.g., a virtual machine (VM) or a container). Conventional threat prevention solutions often utilize software installed in the guest (e.g., in the VM), software installed in the VM manager (e.g., the hypervisor), or a combination thereof. Similar approaches are used for lightweight virtualization, such as user-level kernel isolation systems or kernel-level kernel isolation systems. Threat prevention systems implemented by software installed on the guest can fall prey to the very threats threatening the virtualized computing environment. That is, malicious activity that is threatening the virtualized computing environment can attack the threat prevention software installed on the guest. On the other hand, threat prevention software that operates in the hypervisor may not have access to the main memory of the host on which the VM is operating, and thus may be ineffective in preventing or stopping the malicious activity from progressing.

Conventional threat prevention systems commonly rely on guest, host kernel, and/or hypervisor modifications to support the threat prevention capabilities. Such solutions can be limited to certain cloud providers. Since each cloud provider may support only a subset of the threat prevention capabilities, users are left with inadequate threat protection. Conventional threat prevention systems that are cloud-provider specific may not cover workloads that rely on multi-cloud environments, private cloud environments, hybrid cloud environments, and/or on-premise execution. Furthermore, under conventional threat prevention systems, malicious actors can attempt to escalate their privileges to disable a threat prevention system, thus enabling threats to spread throughout a VM without limitation.

Aspects of the present disclosure can address the above-noted and other deficiencies by implementing threat prevention operations in a separate and isolated device. The separate and isolated device can be a PCIe device, such as a DPU device or a smart NIC connected to the host through a PCIe interface. The separate and isolated device can access the host's main memory used by the virtualized computing environment (e.g., VM or container) operating on the host, e.g., via remote direct memory access (RDMA). Thus, the separate and isolated device can have write-access to the host's main memory.

In some embodiments, the threat prevention system operating on the separate and isolated device can receive a notification from a threat detection system. The threat detection system can operate, for example, at least in part, in the virtualized computing environment, in a hypervisor, and/or in the separate and isolated device. A threat detection system can differentiate malicious activity from benign activity, while a threat prevention system can prevent the threat identified by the threat detections system from progressing in the virtualized computing environment. The threat detection system can identify malicious activity directed to the virtualized computing environment, and can send a notification to the threat prevention system that includes information about the malicious activity. For example, the threat detection system can use offensive security and memory forensics techniques to identify the source of the malicious activity, and in some instances, to determine the extent that the malicious activity propagated through the virtualized computing environment. In some embodiments, the threat detection system can scan the host system's memory used by the virtualized computing environment to detect known malware signatures, for example. Using the detected information, the threat detection system can determine a type of the malicious activity, what section(s) of memory has been affected by the malicious activity, to what extent the malicious activity has been executed, and/or other information regarding the detected malicious activity. The threat detection system can scan the host system's memory at predetermined time intervals, in response to certain triggering events, and/or continuously. The information in the notification sent to the threat prevention system can include, for example, the threat type associated with the malicious activity, a timestamp of when the malicious activity was first detected, a location of memory affected by the malicious activity, etc.

Upon receiving a notification from the threat detection system, the threat prevention system can implement one or more threat prevention operations to address the detected threat. The threat prevention system can identify which threat prevention operation(s) to implement based on, for example, a security characteristic of the virtualized computing environment and/or the type of threat detected. The security characteristic can represent a security policy associated with a functionality offered by the system implementing the virtualized computing environment. The security characteristic can dictate the appropriate threat prevention operation. For example, some virtualized computing environments may be used to support a system that can easily switch between virtualized computing environments, and thus terminating a threatened virtualized computing environment to avoid the potential threat may be a suitable threat prevention operation. Contrastingly, some virtualized computing environments may be supporting a system that cannot easily switch between virtualized computing environments (e.g., switching between VMs may cause unacceptable latency or may disrupt a crucial ongoing process), and thus implementing other less disruptive threat prevention operations may be desirable. In some embodiments, the security characteristic can represent a security level (e.g., an integer within a range of values) that the threat prevention system can use to determine which threat prevention operation to implement. In some embodiments, the threat prevention system can use the security characteristic to determine the order in which to implement a number of threat prevention operations. For example, if the first threat prevention operation fails to mitigate the identified threat, the threat prevention system can select a second threat prevention operation to implement.

The threat prevention operations can include terminating the threatening process, preventing data exfiltration by malicious processes by cleaning data in pages of process, unloading malicious drivers, unloading malicious linked or shared libraries, deleting malicious file contents from a file system, content disarming and reconstruction, isolating the threatened virtualized computing environment from external access, and/or terminating the virtualized computing environment. For example, to terminate a process, the separate and isolated device implementing the threat prevention system can write to the host's main memory to cause the operating system to gracefully eliminate the malicious process, e.g., by causing an exception.

Advantages of the present disclosure include, but are not limited to environment-agnostic threat prevention, isolation of the threat prevention, offloading of critical security services, fine-grained threat prevention, over-the-network threat prevention, and a simplified deployment of the threat prevention system. More specifically, a threat prevention system executed on a separate and isolated device (i.e., out of band threat prevention) can operate regardless of the cloud provider of the threatened virtualized computing environment. Out of band threat prevention operates via write-access to the main memory of the host system hosting the threatened virtualized computing environment, a feature that is supported by all cloud providers. Thus, out of band threat prevention, as described in the present disclosure, provides the same threat prevention benefits to all platforms, including multi-cloud, hybrid-cloud, private cloud, and on-premise execution. Using out of band threat prevention counteracts conventional threat prevention system's dependency on the operating system and/or on the hardware of the host system. Furthermore, using out of band threat prevention simplifies the deployment of the threat prevention system, as it is implemented by a separate and isolated device. Furthermore, isolating the threat prevention on a separate device (e.g., on a processor that is separate from the process which serves external clients) makes it harder for threatening malware to disable the threat prevention system itself.

Another advantage of the present disclosure includes offloading critical security services, thus freeing the main processor to handle other tasks, while the threat prevention system is being performed on the separate and isolated device. Furthermore, the threat prevention system described in the present disclosure has fine-grained control over the prevention mechanism employed to handle each threat, e.g., by basing the threat prevention operation(s) implemented on the type of threat detected and/or on a security characteristic of the threatened virtualized computing environment. Furthermore, the threat prevention system may be offloaded across network fabric to enable remote threat prevention. This could further be strengthened when combined with intrusion detection and prevention systems that monitor network activity for threats. Out of band threat prevention, as described in the present disclosure, mitigates identified threats with minimal to no effect on the functionality supported by the virtualized computing environment.

FIG. 1 illustrates an example computing environment 100, in accordance with embodiments of the present disclosure. It should be noted that other architectures for computing environment 100 are possible, and that the implementation of a computing environment utilizing embodiments of the present disclosure are not necessarily limited to the specific architecture depicted. Computing environment 100 may be a computing environment that is configured to provide on-demand availability of computing resources to consumers without direct management by the consumers. In one example, computing environment 100 may be a cloud computing environment (e.g., public cloud, private cloud, hybrid cloud) and the user devices and host devices may be associated with different entities (e.g., cloud consumer v. cloud provider). In another example, computing environment 100 may be an on-premises computing environment in which the user devices and host devices are associated with the same entity (e.g., same company, enterprise, or business entity). In the simplified example of FIG. 1, computing environment 100 may include a user device 110, a host device 105, a data processing unit (DPU) device 102, and a network 140.

User device 110 may be any computing device that consumes the computing resources of host device 105 and may provide input data (e.g., code or configurations) that enable the host device 105 to execute computing tasks on behalf of user device 110. User device 110 may include one or more servers, workstations, desktop computers, laptop computers, tablet computers, mobile phones, robotic devices (e.g., drones, autonomous vehicles), personal digital assistants (PDAs), smart watches, other device, or a combination thereof.

Host device 105 may be a single host machine or multiple host machines arranged in a heterogeneous or homogenous group (e.g., cluster). In one example, host device 105 may be or include one more servers, workstations, personal computers (e.g., desktop computers, laptop computers), mobile computers (e.g., mobile phones, palm-sized computing devices, tablet computers, personal digital assistants (PDAs)), data storage devices (e.g., USB drive, Network Attached Storage (NAS), Storage Area Network (SAN)), network devices (e.g., routers, switches, access points), other devices, or a combination thereof.

Host device 105 may include multiple primary devices that include one or more resources 114, such main memory 116 and/or one or more processors 118. Processor 118 may be or include a Central Processing Unit (CPU) and may be referred to as the primary processor, host processor, main processor, other term, or a combination thereof. Processor 118 may have an Instruction Set Architecture (ISA) that is the same or similar to x86, ARM, Power ISA, RISC-V, SPARC, MIPS, other architecture, or a combination thereof. Processor 1118 may be coupled to memory 116 and memory 116 may be shared by one or more devices of host device 105. Memory 116 may be referred to as main memory, host memory, primary memory, other term, or a combination thereof. Host device 105 may include one or more virtualized computing environments 107 (e.g., virtual machines, containers, etc.). As illustrated in FIG. 1, the virtualized computing environment 107 can be multiple virtual machines VM 111A-N, managed by a virtual machine monitor (VMM) 112. In other embodiments not pictured, virtualized computing environment 107 can be one or more containers. Host device 105 may include or be coupled with one or more DPU devices 102.

A DPU device 102 may be a computing device that is communicably coupled with host device 105 and may perform one or more data processing tasks for host device 105. DPU device 102 may be internal or external to host device 105 and may be a peripheral device (e.g., PCIe device) in the form of a physical adapter, card, component, module, or other device that is physically located on the same chassis as host device 105 (e.g., same board, case, tower, rack, cabinet, room, building) or on a different chassis. DPU device 102 may perform data processing tasks that are the same or similar to the data processing tasks performed by processor 118 or may perform data processing tasks that are not performed by processor 118.

As illustrated in FIG. 1, the DPU device 102 can include a threat detection component 103 and a threat prevention component 104. The threat detection component 103 can be software that detects malicious activity directed to a virtualized computing environment 107. The threat detection component 103 can run in the DPU device 102. In some embodiments, the threat detection component 103 (or a part of the threat detection component 103) can run within a virtualized computing environment 107, within the VMM 112, and/or within the DPU device 102. The threat detection component 103 can access main memory 116, and can use memory forensics techniques to identify the type of threat detected. For example, the threat detection component 103 can scan the main memory 116 (either continuously, on a predetermined schedule (e.g., every few seconds), or in response to a triggering event) to detect known malware signatures. The threat detection component 103 can detect and classify whether the malware is operating in main memory 116, whether the malware has not yet begun operation, what operations the malware has performed, etc. The threat detection component 103 can continuously analyze main memory 116 to detect and identify potential and/or ongoing threats.

Upon detecting malicious activity, the threat detection component 103 can provide (e.g., send or store in a particular location) a notification to the threat prevention component 104. The notification can include information about the malicious activity, such as a threat type, a timestamp indicating when the threat (e.g., the malicious activity) was first detected, and/or a location of where the detected malicious activity occurred. The threat type can be, for example, a malicious process, a malicious driver, a malicious library, malicious file(s) on a file system, ransomware, a vulnerability (e.g., a zero-day exploit or attack), exploitation in code of any layer (e.g., process, linked libraries, drivers, etc.), system and/or service misconfigurations, privilege escalation, and/or any other type of threat.

Upon receiving a notification of a detected threat from the threat detection component 103, the threat prevention component 104 can identify and implement a threat prevention operation. A threat prevention operation can include, for example, gracefully terminating the identified malicious process, preventing data exfiltration by the identified malicious process, unloading malicious drivers, unloading malicious linked or shared libraries, deleting malicious files from a file system, isolating the threatened VM 111A-N from external access, disarming the malicious content and reconstructing the affected processes, and/or terminating the threatened VM 111A-N. For example, the threat prevention component 104 can write to the host's main memory to cause an exception. When such an exception occurs, the operating system handles the exception by terminating the offending process. It should be noted that terminating the process in this way does not warrant changes to the VMs 111A-N or to the VMM 112, as the threat prevention component 104 has write-access to the main memory 116. Furthermore, a graceful termination of the offending process by the operating system is unlikely to cause any negative side effects to the operating system itself.

As an illustrative example, the processor 118 may support virtual memory abstraction that depends on a page table. The page table may contain entries that enable virtual-to-physical address translation. The page table may also contain a security feature, such as marking a page as non-executable using a no-execute (NX) bit. The threat detection component 103 can notify the threat prevention component 104 of the virtual address associated with the identified threat. The threat prevention component 104 can identify the entry in the page table corresponding to the virtual address, and can mark the associated page as non-executable using the NX bit. Thus, when data residing in a page marked as non-executable is executed, an exception will be raised. The exception will be handled by the operating system by killing the violating process. In some implementations, the threat prevention component 104 can set the page table entry (or entries) pointing to the stack or heap as read-only, which will cause an exception whenever the process tries to write to the stack or heap, and kill the process. In some implementations, the threat prevention component 104 can set the pages of a user-mode process as non-accessible for user-mode process (e.g., set the user-mode process to kernel-mode access only), which will in turn cause an exception and kill the process. In some implementations, the threat prevention component 104 can modify the stack canary (e.g., by setting the entire stack context to 0x00), which will result in an exception and kill the process. Such examples cause the operating system to gracefully eliminate the process, without causing any negative side effects (e.g., hanging or crashing) to the operation system.

In some embodiments, the threat prevention component 104 can determine that the threatening process has already executed, at least in part. For example, the threat prevention component 104 can determine that the threatening process wrote to main memory 116, installed a malicious driver, installed a malicious linked or shared library, or added malicious file content to a file system. The threat prevention component 104 can reverse the operations performed by the identified threat. For example, the threat prevention component 104 can erase the section of main memory 116 written or modified by the threatening process, can unload the malicious driver and/or the malicious linked or shared library, and can delete the malicious file content from the file system. In some embodiments, the threat prevention component 104 can further reconstruct the affected resources. For example, the threat prevention component 104 can install a previous version of the driver or linked library to overwrite a driver or linked library that was affected by the threat. As another example, the threat prevention component 104 can reinstate the section of main memory 116 to a version that predates the timestamp of the identified threat. As another example, the threat prevention component 104 can overwrite the identified threatening process with a safe process that is stored on an isolated device (not pictured). As another example, the threat detection component 103 may identify a ransomware attack on VM 111A-N. The threat prevention component 104 can extract the key that the ransomware used to encrypt files, and can use the key to decrypt the files.

In some embodiments, the threat prevention component 104 can isolate the threatening VM 111A-N from external access by blocking all communication to and from the VM 111A-N. In some embodiments, the threat prevention component 104 can terminate the threatened VM 111A-N. Prior to terminating the threatened VM 111A-N, the threat prevention component 104 can preserve the data inside the threatened VM 111A-N for further analysis. In some embodiments, the threat prevention component 104 can notify the host 105 of the detected threat and the threat prevention operation(s) performed to address the detected threat. The host 105 can, in some embodiments, notify the user device 110 of the threat and threat prevention operations performed.

In some embodiments, the threat prevention component 104 can determine which threat prevention operation(s) to implement based on the type of the identified thread in conjunction with the security characteristic of the threatened VM 111A-N and/or of the virtualized computing environment 107. The security characteristic can represent a security policy associated with a functionality offered by the system implementing the virtualized computing environment. For example, the security policy can indicate that terminating a threatened VM 111A-N would cause an unacceptable disruption to the functionality offered by the system implementing the threatened VM 111A-N, and thus terminating the threatened VM 111A-N should be executed as a last resort threat prevention operation. As another example, the security policy may indicate that the services provided by the threatened VM 111A-N can easily be transferred to another not-threatened VM (either executing on host 105 or on another host), and thus terminating the threatened VM 111A-N may the quickest and easiest way to address the identified threat. In some embodiments, the threat prevention component 104 can rank the applicable threat prevention operations based on the security policy associated with the threatened VM 111A-N, in order of preferred execution. The threat prevention component 104 can then execute the top-ranked threat prevention operation first, and if that does not address the identified threat, can then execute the other threat prevention operations in their ranked order, one at a time, until the identified threat has been addressed. For example, the threat prevention component 104 can execute the top-ranked threat prevention operation. If the executed top-ranked threat prevention operation did not address the identified threat, the threat prevention component 103 can send another notification to the threat prevention component 104 indicating that the threatened VM 111A-N is still being threatened by the identified threat. The threat prevention component 104 can then execute the second-ranked threat prevention operation, and so on, until the threat has been addressed.

In some embodiments, the threat prevention component 104 can be implemented remotely via network 140. That is, when the threat prevention component 104 is deployed in a device (e.g., DPU 102) with network capabilities, the threat prevention component 104 can be offloaded across the network fabric to enable remote threat prevention. For example, DPU 102 can have remote direct memory access (RDMA) capabilities, and thus can access the main memory of a remote host (not pictured) over network 140. The threat prevention component 104 can then operate remotely, providing the same level of security over network 140.

Figure 2:
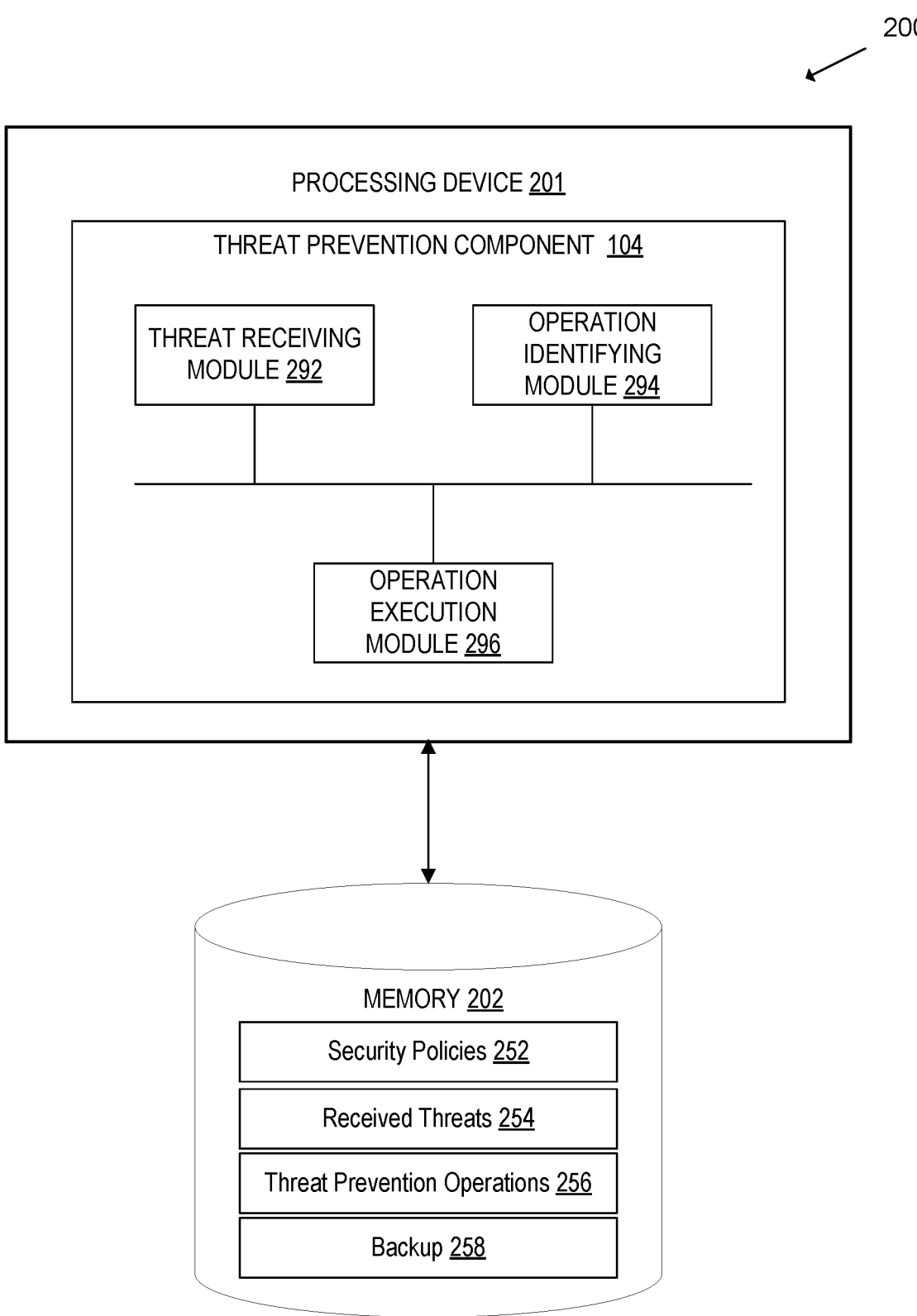
FIG. 2 depicts a block diagram illustrating a computer system operating in accordance with one or more aspects of the present disclosure.

FIG. 2 depicts a block diagram of a computer system 200 operating in accordance with one or more aspects of the present disclosure. Computer system 200 may perform the same functions as DPU device 102 of FIG. 1, and may include one or more processing device 201 and may be coupled with one or more memory devices 202. In some embodiments, computer system 200 may be any PCIe device communicably coupled with the main memory of the host system implementing one or more virtualized computing environments (e.g., main memory 116 of host 105). Processing device 201 can be communicably coupled with a host system 105, e.g., via a PCIe interface. Processing device 201 use direct memory access (DMA) or remote direct memory access (RMDA) to access the main memory 116 of the host system 105 executing virtualized computing environments (e.g., virtual machines, containers).

Threat prevention component 104 can include a threat receiving module 292, an operation identifying module 294, and an operation execution module 296. The threat receiving module 292 can enable the processing device 201 to receive notifications of identified threats from a threat detection component 103. In some embodiments, the threat detection component 103 can operate on processing device 201. In some embodiments, the threat detection component 103 can operate on a separate processing device (not pictured). The threat receiving module 292 can enable the processing device 201 to receive a notification that indicates the type of threat identified, the affected virtualized computing environment(s), the location of the identified threat (e.g., which section of main memory 116 is or may be affected by the identified threat), and/or a timestamp indicating when the threat was first identified. In some embodiments, the threat receiving module 292 can store the received information in received threats 254 of memory 202.

Operation identifying module 294 can enable the processing device 201 to determine which threat prevention operation(s) to implement. A list of potential threat prevention operations can be stored in threat prevention operations 256 of memory 202. The threat prevention operations can include, for example, terminating the threatening process, preventing data exfiltration by malicious processes by cleaning data in pages of process, unloading malicious drivers, unloading malicious linked or shared libraries, deleting malicious file contents from a file system, content disarming and reconstruction, isolating the threatened virtualized computing environment from external access, and/or terminating the virtualized computing environment. Each threat prevention operation can be associated with one or more types of threats.

The operation identifying module 294 can enable the processing device 201 to determine the appropriate threat prevention operations 256 based on the type of threat identified, and/or based on a security characteristic of the threatened virtualized computing environment. The threatened virtualized computing environment can have an associated security policy, stored in security policies 252 of memory 202. The security policy can dictate which threat prevention operation to employ, and/or can rank the threat prevention operations in order of preference. As an illustrative example, a virtualized computing environment that is being used for online gaming may have a security policy that prioritizes terminating the threatened virtualized computing environment, since online gaming may have other, readily available virtualized computing environments to take over for the threatened virtualized computing environment. On the other hand, a virtualized computing environment that is being used to implement a critical service (e.g., online banking) may have a security policy that ranks terminating the virtualized computing environment as the last resort, since terminating the virtualized computing environment may cause unnecessary latency to the process or may disrupt an ongoing, critical process (i.e., if other threat prevention operations can address and mitigate the identified threat, those should be executed first). Thus, in this scenario, the operation identifying module 294 may rank a threat prevention operation that terminates the process higher than a threat prevention operation that terminates the virtualized computing environment.

In some embodiments, the operation identifying module 294 can compare the received threat to the list of received threats 254 stored in memory 202, to determine whether a threat prevention operation has already been implemented in an attempt to address the identified threat. If so, the operation identifying module 294 can select the next threat prevention operation in the list of ranked threat prevention operations for the identified threat threatening the virtualized computing environment.

The operation execution module 296 can enable processing device 201 to cause the identified threat prevention operation to be performed on host system 105. The operation execution module 296 can update received threats 254 to indicate which threat prevention operation was performed on host system 105 to address the identified received threat. Performing the threat prevention operation can include preserving the data in the virtualized computing environment. In some embodiments, the threat prevention operation can include restoring a section of main memory 116 of host 105, reconstructing a compromised malicious library or driver (e.g., by reconstructing the original library or driver to replace infected ones), and/or restoring a file system to a previous version. The operation execution module 296 can identify, from backup 258, a version of the affected memory, library, driver, and/or file system that predates the timestamp of the received threat 254, and can reconstruct the affected memory, library, driver, and/or file system.

FIG. 3 illustrates an example flow diagram of an example method 300 for implementing out of band threat prevention, according to at least one embodiment. In some embodiments, one or more operations of example method 300 can be performed by one or more components of FIG. 1, as described herein. Method 300 can be performed by processing logic that can include hardware (circuitry, dedicated logic, etc.), software (e.g., instructions run on a processing device), or a combination thereof. In one implementation, some or all of the operations of method 300 can be performed by device 102. For example, some or all of the operations of method 300 can be performed by one or more components of threat prevention component 104 (e.g., residing at device 102), as described herein.

At block 310, processing logic receives a notification of a threat associated with a virtualized computing environment (e.g., a VM, or a container) on a host system coupled to a DPU. The DPU can have access to memory of the host system. For example, the DPU can access the memory of the host system via direct memory access (DMA) or remote direct memory access (RDMA). The DPU can be isolated from the virtualized computing environment. The virtualized computing environment can have an associated security characteristic, e.g., representing a security policy of the virtualized computing environment.

At block 312, processing logic identifies a threat type associated with the threat. The threat type can be, for example, a process operating on the host system, malicious software, a malicious driver, a malicious linked library, a malicious content of a file system, a vulnerability, exploit in code of any layer (e.g., process, linked libraries, drivers, etc.), system and/or service misconfigurations, privilege escalation, and/or any other type of threat. An exploit can be described as code that takes advantage of software vulnerability or a security flaw. A vulnerability can be described as a weakness or error in code that, when exploited, can create a potential risk of compromising data and/or security. As an example, a zero-day exploit can be an exploit or attack on a vulnerability that has been identified but not yet patched.

At block 314, processing logic determines, based on the threat type associated with the threat and/or the security characteristic of the virtualized computing environment, a threat prevention operation to address the threat. In some embodiments, responsive to determining that the threat type corresponds to a process operating on a host system, the threat prevention operation can include identifying, based on the received notification, a page table entry associated with the process executing the threat. The threat prevention operation can terminate the process by setting the page entry associated with the process to read-only, setting the page table entry to kernel access mode, setting a stack content associated with the page table entry to a null value, and/or marking the page associated with the page table entry as non-executable.

In some embodiments, responsive to determining that the threat type corresponds to malicious software executing on the virtualized computing environment, the threat prevention operation can include identifying, based on the received notification, the malicious software. The malicious software can include, for example, a driver, a library, and/or a process. The threat prevention operation can overwrite the malicious software (e.g., overwrite the driver, the library, and/or the process) with a predefined software (e.g., a predefined driver, library, and/or process). In some embodiments, the predefined software can be stored on a second DPU. In some embodiments, the predefined software can be a benign piece of software that is generated by the DPU. In some embodiments, the predefined software can be a previous version of the software that executed prior to the threat being detected. In some embodiments, the received notification can include a timestamp indicating when the threat was first detected, and threat prevention operation can overwrite the malicious software with a version of the software that predates the timestamp. In some embodiments, the malicious software can be ransomware, in which case the processing logic can identify the key used to encrypt files, and can decrypt the encrypted files. The processing logic can stop the ransomware from encrypting more files.

In some embodiments, responsive to determining that the threat type corresponds to identifying malicious content of a file system, the threat prevention operation can include identifying, based on the received notification, one or more malicious files in the file system associated with the virtualized computing environment. The threat prevention operation can delete the one or more identified malicious files.

In some embodiments, the security characteristic can satisfy a condition. For example, the security characteristic can represent a security policy associated with the virtualized computing environment. Responsive to determining that the security characteristic satisfies the condition, the threat prevention operation can include isolating the virtualized computing environment from external access, and/or terminating the virtualized computing environment. In some embodiments, the condition can be that the security policy indicates that isolating and/or terminating the virtualized computing environment takes priority over other threat prevention operations.

At block 316, processing logic causes the threat prevention operation to be performed on the host system. In some embodiments, processing logic can determine that the threat prevention operation failed to address the threat. For example, processing logic can identify, in a data structure (e.g., received threats 254 of FIG. 2), whether the identified threat in the received notification matches one that has been previously received. For example, the identified threat can have an associated threat ID. The data structure can include an identification of the prior threat prevention operation(s) performed to address the identified threat. Processing logic can identify a second threat prevention operation, based on the threat type and/or the security characteristic of the virtualized computing environment, and can cause the second threat prevention operation to be performed on the host system. Processing logic can continue to identify, and to cause to be performed, subsequent threat prevention operations (based on the threat type and/or the security characteristic of the virtualized computing environment) until the threat has been addressed (i.e., until the threat is no longer being identified by the threat detection component), and/or until the final threat prevention operation causes the virtualized computing environment to be terminated. In some embodiments, prior to causing the threat prevention operation to be performed on the host system, processing logic can preserve a state of the memory (or a subset of the memory, e.g., the affected portion of the memory) of the host system.

Figure 4:
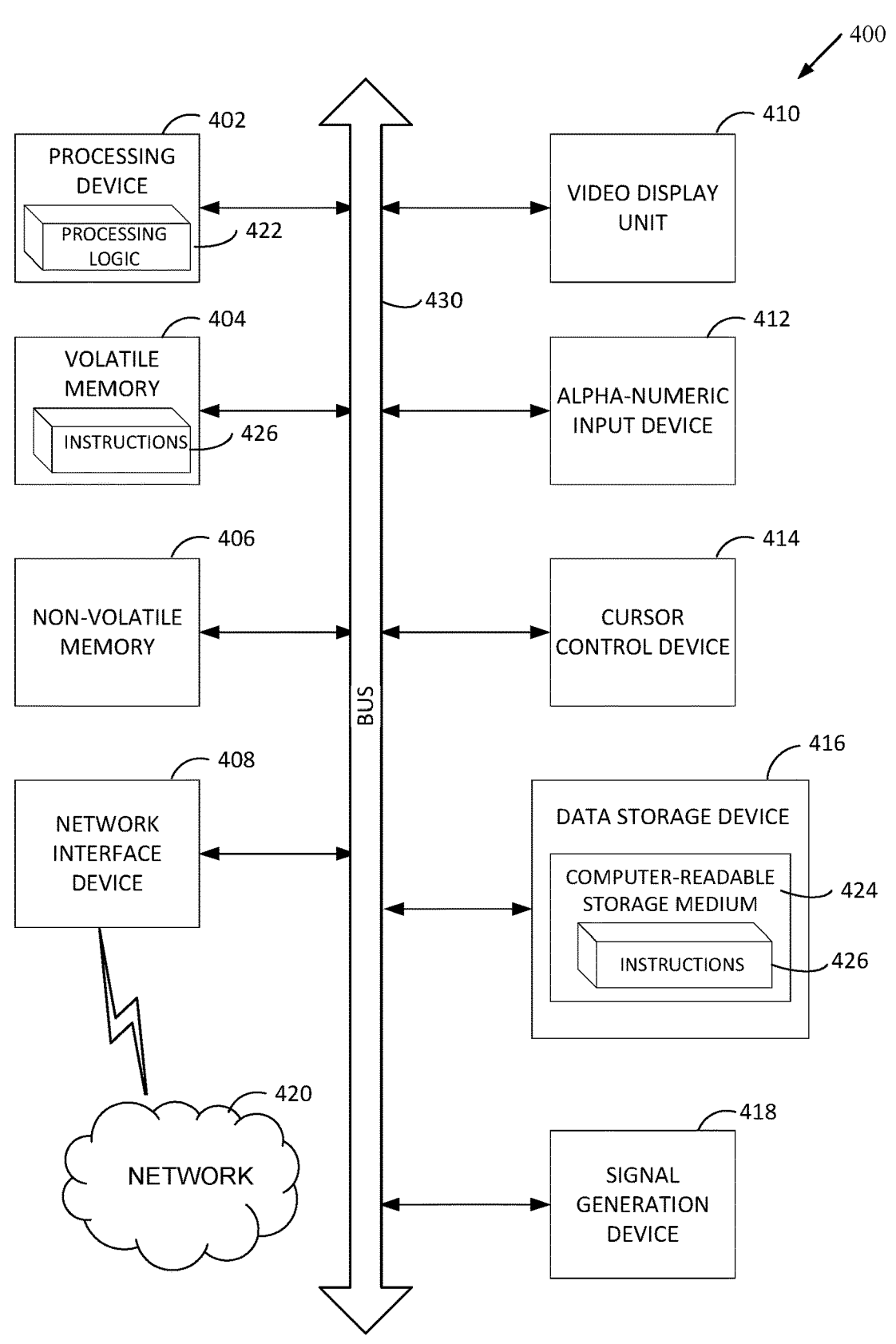
FIG. 4 depicts a block diagram illustrating an exemplary computer device 400, in accordance with one or more aspects of the present disclosure.

FIG. 4 illustrates a block diagram illustrating an exemplary computer device 400, in accordance with implementations of the present disclosure. Computer device 400 can correspond to one or more components of host 105 and/or one or more components of device 201, as described above. Example computer device 400 can be connected to other computer devices in a LAN, an intranet, an extranet, and/or the Internet. Computer device 400 can operate in the capacity of a server in a client-server network environment. Computer device 400 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 400 can include a processing device 402 (also referred to as a processor, CPU, or GPU), a volatile memory 404 (or main memory, e.g., read-only memory (ROM), flash memory, dynamic random access memory (DRAM) such as synchronous DRAM (SDRAM), etc.), a non-volatile memory 406 (e.g., flash memory, static random access memory (SRAM), etc.), and a secondary memory (e.g., a data storage device 416), which can communicate with each other via a bus 430.

Processing device 402 (which can include processing logic 422) represents one or more general-purpose processing devices such as a microprocessor, central processing unit, or the like. More particularly, processing device 402 can be a complex instruction set computing (CISC) micro-processor, reduced instruction set computing (RISC) micro-processor, very long instruction word (VLIW) microprocessor, processor implementing other instruction sets, or processors implementing a combination of instruction sets. Processing device 402 can also be one or more special-purpose processing devices such as an ASIC, a FPGA, a digital signal processor (DSP), network processor, or the like. In accordance with one or more aspects of the present disclosure, processing device 402 can be configured to execute instructions performing method 300 for implementing out of band threat prevention.

Example computer device 400 can further comprise a network interface device 408, which can be communicatively coupled to a network 420. Example computer device 400 can further comprise a video display 410 (e.g., a liquid crystal display (LCD), a touch screen, or a cathode ray tube (CRT)), an alphanumeric input device 412 (e.g., a keyboard), a cursor control device 414 (e.g., a mouse), and an acoustic signal generation device 418 (e.g., a speaker).

Data storage device 416 can include a computer-readable storage medium (or, more specifically, a non-transitory computer-readable storage medium) 424 on which is stored one or more sets of executable instructions 426. In accordance with one or more aspects of the present disclosure, executable instructions 426 can comprise executable instructions performing method 300 for implementing out of band threat prevention.

Executable instructions 426 can also reside, completely or at least partially, within volatile memory 404 and/or within processing device 402 during execution thereof by example computer device 400, volatile memory 404 and processing device 402 also constituting computer-readable storage media. Executable instructions 426 can further be transmitted or received over a network via network interface device 408.

While the computer-readable storage medium 424 is shown in FIG. 4 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMS, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
a memory; and
a processor of a first data processing unit (DPU) communicably coupled to the memory, wherein the first DPU is configured to:

receive a notification of a threat associated with a virtualized computing environment on a host system coupled to the first DPU, wherein the first DPU is associated with a security characteristic;
identify a threat type associated with the threat;
determine, based on at least one of the threat type associated with the threat or the security characteristic of the virtualized computing environment, a threat prevention operation to address the threat; and
cause, by the first DPU, the threat prevention operation to be performed on the host system to address the threat associated with the virtualized computing environment, wherein the first DPU is isolated from the virtualized computing environment, and wherein the threat prevention operation comprises: modifying one or more memory permissions of the host system to prevent execution of malicious code associated with the threat by causing an exception, deleting malicious content from a file system associated with the virtualized computing environment, disarming malicious content and reconstructing a process affected by the malicious content, isolating the virtualized computing environment from external access, and/or terminating the virtualized computing environment.

2. The system of claim 1, wherein the first DPU has write access to memory of the host system.

3. The system of claim 1, wherein the threat type comprises at least one of: a process operating on the host system, malicious software, a malicious driver, a malicious linked library, the malicious content of the file system, a vulnerability, a misconfiguration, a privilege escalation, or an exploit.

4. The system of claim 1, wherein responsive to determining that the threat type corresponds to a process operating on the host system, the threat prevention operation comprises:

identifying, based on the notification, a page table entry associated with the process executing the threat; and
terminating the process by performing at least one of: setting the page table entry associated with the process to read-only, setting the page table entry to kernel access mode, setting a stack content associated with the page table entry to a null value, or marking a page associated with the page table entry as non-executable.

5. The system of claim 1, wherein responsive to determining that the threat type corresponds to malicious software executing on the virtualized computing environment, the threat prevention operation comprises:

identifying, based on the notification, the malicious software, wherein the malicious software comprises at least one of a driver, a library, or a process; and
overwriting the malicious software with a predefined software.

6. The system of claim 5, wherein the predefined software comprises one of: a backup software stored on a second DPU, or a benign software generated by the first DPU.

7. The system of claim 1, wherein responsive to determining that the threat type corresponds to the malicious content of the file system, the threat prevention operation comprises:

identifying, based on the notification, one or more malicious files in the file system associated with the virtualized computing environment; and
deleting the one or more malicious files.

8. The system of claim 1, further comprising:
responsive to determining that the threat prevention operation failed to address the threat, causing a second threat prevention operation to be performed on the host system.

9. The system of claim 1, further comprising:
preserving a state of a memory of the host system prior to causing the threat prevention operation to be performed on the host system.

10. A method comprising:
receiving, by a first data processing unit (DPU), a notification of a threat associated with a virtualized computing environment on a host system coupled to the first DPU, wherein the first DPU is associated with a security characteristic;
identifying a threat type associated with the threat;
determining, based on at least one of the threat type associated with the threat or the security characteristic of the virtualized computing environment, a threat prevention operation to address the threat; and
causing, by the first DPU, the threat prevention operation to be performed on the host system to address the threat associated with the virtualized computing environment, wherein the first DPU is isolated from the virtualized computing environment, and wherein the threat prevention operation comprises: modifying one or more memory permissions of the host system to prevent execution of malicious code associated with the threat by causing an exception, deleting malicious content from a file system associated with the virtualized computing environment, disarming malicious content and reconstructing a process affected by the malicious content, isolating the virtualized computing environment from external access, and/or terminating the virtualized computing environment.

11. The method of claim 10, wherein the DPU has write access to memory of the host system.

12. The method of claim 10, wherein the threat type comprises at least one of: a process operating on the host system, a malicious driver, a malicious linked library, the malicious content of the file system, a vulnerability, a misconfiguration, a privilege escalation, or an exploit.

13. The method of claim 10, wherein responsive to determining that the threat type corresponds to a process operating on the host system, the threat prevention operation comprises:
identifying, based on the notification, a page table entry associated with the process executing the threat; and
terminating the process by performing at least one of: setting the page table entry associated with the process to read-only, setting the page table entry to kernel access mode, setting a stack content associated with the page table entry to a null value, or marking a page associated with the page table entry as non-executable.

14. The method of claim 10, wherein responsive to determining that the threat type corresponds to malicious software executing on the virtualized computing environment, the threat prevention operation comprises:
identifying, based on the notification, the malicious software, wherein the malicious software comprises at least one of a driver, a library, or a process; and
overwriting the malicious software with a predefined software.

15. The method of claim 14, wherein the predefined software comprises one of: a backup software stored on a second DPU, or a benign software generated by the first DPU.

16. The method of claim 10, wherein responsive to determining that the threat type corresponds to the malicious content of the file system, the threat prevention operation comprises:
identifying, based on the notification, one or more malicious files in the file system associated with the virtualized computing environment; and
deleting the one or more malicious files.

17. The method of claim 10, further comprising:
preserving a state of a memory of the host system prior to causing the threat prevention operation to be performed on the host system.

18. A non-transitory computer-readable medium storing instructions thereon, wherein the instructions, when executed by a processing device of a computing system that hosts one or more guests, cause the processing device to perform operations comprising:
receiving, by a data processing unit (DPU), a notification of a threat associated with a virtualized computing environment on a host system coupled to the DPU, wherein the DPU is associated with a security characteristic;
identifying a threat type associated with the threat;
determining, based on at least one of the threat type associated with the threat or the security characteristic of the virtualized computing environment, a threat prevention operation to address the threat; and
causing, by the DPU, the threat prevention operation to be performed on the host system to address the threat associated with the virtualized computing environment, wherein the DPU is isolated from the virtualized computing environment, and wherein the threat prevention operation comprises: modifying one or more memory permissions of the host system to prevent execution of malicious code associated with the threat by causing an exception, deleting malicious content from a file system associated with the virtualized computing environment, disarming malicious content and reconstructing a process affected by the malicious content, isolating the virtualized computing environment from external access, and/or terminating the virtualized computing environment.

19. The non-transitory computer-readable medium of claim 18, wherein responsive to determining that the threat type corresponds to a process operating on the host system, the threat prevention operation comprises:
identifying, based on the notification, a page table entry associated with the process executing the threat; and
terminating the process by performing at least one of: setting the page table entry associated with the process to read-only, setting the page table entry to kernel access mode, setting a stack content associated with the page table entry to a null value, or marking a page associated with the page table entry as non-executable.

20. The non-transitory computer-readable medium of claim 18, wherein responsive to determining that the threat type corresponds to malicious software executing on the virtualized computing environment, the threat prevention operation comprises:
identifying, based on the notification, the malicious software, wherein the malicious software comprises at least one of a driver, a library, or a process; and
overwriting the malicious software with a predefined software.

* * * * *